(12) United States Patent
Shelly et al.

(10) Patent No.: US 12,548,650 B2
(45) Date of Patent: Feb. 10, 2026

(54) METHODS AND SYSTEMS FOR PERFORMING DOSE TITRATION

(71) Applicant: KONINKLIJKE PHILIPS N.V., Eindhoven (NL)

(72) Inventors: Benjamin Irwin Shelly, Pittsburgh, PA (US); William Gaussa, Jeannette, PA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1141 days.

(21) Appl. No.: 17/488,479

(22) Filed: Sep. 29, 2021

(65) Prior Publication Data

US 2022/0101975 A1    Mar. 31, 2022

Related U.S. Application Data

(60) Provisional application No. 63/085,300, filed on Sep. 30, 2020.

(51) Int. Cl.
*G16H 20/10* (2018.01)
*A61B 5/00* (2006.01)
(Continued)

(52) U.S. Cl.
CPC ............ *G16H 20/10* (2018.01); *A61B 5/021* (2013.01); *A61B 5/024* (2013.01);
(Continued)

(58) Field of Classification Search
CPC ........ G16H 20/10; G16H 20/13; A61B 5/021; A61B 5/024; A61B 5/14542; A61B 5/4836; A61B 5/4848; A61B 5/681; A61B 5/6898
See application file for complete search history.

(56) References Cited

U.S. PATENT DOCUMENTS

| 11,911,351 B2* | 2/2024 | Miller ..................... A61P 11/00 |
| 2005/0154537 A1* | 7/2005 | Kutzko .............. A61K 49/0004 |
| | | 702/19 |

(Continued)

FOREIGN PATENT DOCUMENTS

| JP | 2018153569 A | 10/2018 |
| JP | 2020115263 A | 7/2020 |

(Continued)

OTHER PUBLICATIONS

Ghafoor et. al. "Intrathecal drug therapy for long-term pain management." American Journal of Health-System Pharmacy 64.23: 2447(15). American Society of Health-System Pharmacists. (Dec. 1, 2007) (Year: 2007).*

(Continued)

*Primary Examiner* — Linh Giang Le
(74) *Attorney, Agent, or Firm* — Michael W. Haas

(57) ABSTRACT

The invention provides a computer-implemented method for controlling a dose titration of a medicament to be provided to a subject for treating obstructive sleep apnea. The method includes obtaining a dose level of a previous dose of the medicament, the previous dose having been provided to the subject and obtaining a medicament efficacy measure based on a response of the subject to the previous dose. A dose titration for a future dose of the medicament is determined based on the medicament efficacy measure and the dose level of the previous dose.

12 Claims, 4 Drawing Sheets

(51) Int. Cl.
  *A61B 5/021* (2006.01)
  *A61B 5/024* (2006.01)
  *A61B 5/145* (2006.01)

(52) U.S. Cl.
  CPC ........ *A61B 5/14542* (2013.01); *A61B 5/4836* (2013.01); *A61B 5/4848* (2013.01); *A61B 5/681* (2013.01); *A61B 5/6898* (2013.01)

(56) References Cited

U.S. PATENT DOCUMENTS

| | | |
|---|---|---|
| 2013/0281523 A1 | 10/2013 | Letendre |
| 2017/0128002 A1 | 5/2017 | Christopherson |
| 2019/0282450 A1* | 9/2019 | Lam ................. A61J 7/0481 |

FOREIGN PATENT DOCUMENTS

| | | | |
|---|---|---|---|
| WO | WO-2012125809 A1 * | 9/2012 | ............. A61K 38/21 |
| WO | 2019152475 A1 | 8/2019 | |

OTHER PUBLICATIONS

Taranto-Montemurro et. al. The Combination of Atomoxetine and Oxybutynin Greatly Reduces Obstructive Sleep Apnea Severity. A Randomized, Placebo-controlled, Double-Blind Crossover Trial. Am J Respir Crit Care Med. May 15, 2019;199(10):1267-1276. doi: 10.1164/rccm.201808-1493OC (Year: 2019).*

Apnimed, https://apnimed.com/, Accessed Sep. 28, 2021.

Taranto-Montemurro, L. et al., "The Combination of Atomoxetine and Oxybutynin Greatly Reduces Obstructive Sleep Apnea Severity. A Randomized, Placebo-controlled, Double-Blind Crossover Trial", American Journal of Respiratory and Critical Care Medicine > List of Issues > vol. 199, Issue 10.

* cited by examiner

METHODS AND SYSTEMS FOR PERFORMING DOSE TITRATION

CROSS-REFERENCE TO PRIOR APPLICATIONS

This application claims the benefit of U.S. Provisional Application No. 63/085,300, filed on 30 Sep. 2020. This application is hereby incorporated by reference herein.

FIELD OF THE INVENTION

The invention relates to the field of dose titration, and more specifically to the field of automated dose titration.

BACKGROUND OF THE INVENTION

Obstructive sleep apnea (OSA) is typically treated by continuous positive airway pressure (CPAP) treatment. CPAP treatment which is typically well-tolerated by subjects, but the treatment requires sleeping with a CPAP device and mask, which can cause discomfort.

Recent research in the field of pharmacotherapy has demonstrated the possibility of treating OSA with pharmaceutical therapy. Pharmacotherapy of OSA has few disadvantages; however, efficacy of the medicaments, side effects caused by the medicaments, and subject tolerance of the medicaments over a longer term are key factors that require close monitoring. Further, as patients change over time, for example in weight, sleeping body position, age and the like, a dose level of a medicament that was determined at a previous point in time may no longer prove optimal.

There is therefore a need for a means of determining an optimal dose level of a medicament for a subject over time.

SUMMARY OF THE INVENTION

The invention is defined by the claims.

According to examples in accordance with an aspect of the invention, there is provided a computer-implemented method for controlling a dose titration of a medicament to be provided to a subject for treating obstructive sleep apnea, the method comprising:
  obtaining a dose level of a previous dose of the medicament, the previous dose having been provided to the subject;
  obtaining a medicament efficacy measure based on a response of the subject to the previous dose; and
  determining a dose titration for a future dose of the medicament based on the medicament efficacy measure and the dose level of the previous dose.

The method provides a means for automatically controlling the dose titration of a medicament to be provided to a subject. In this way, the optimal dose level of the medicament may be achieved for an individual subject based on their response to the previous dose of the medicament.

In an embodiment, the method comprises obtaining a dose level of a plurality of previous doses and obtaining a medicament efficacy measure of each of the plurality of previous doses, wherein determining the dose titration is based on the plurality of medicament efficacy measures and the dose levels of the plurality of previous doses.

In this way, the response of the subject to the dose levels of the medicament over time can be taken into account, thereby improving the determined dose titration for the subsequent dose.

In a further embodiment, the method further comprises determining a proportion of the plurality of previous doses that were successfully taken by the subject.

In this way, the adherence of the subject to the provided doses of the medicament may be taken into account when determining the dose titration for the subsequent dose.

In an embodiment, the medicament comprises a plurality of component medicaments and the dose level comprises a plurality of component levels, wherein each component level represents a proportion of a component medicament in the dose of the medicament, and wherein determining the dose titration comprises determining a dose titration for one or more of the component medicaments.

In this way, a plurality of different medicament components may be controlled in conjunction with each other. Further, the dose titration may additionally take account of the interaction between two or more medicament components and their effects of a given subject.

In a further embodiment, the medicament comprises oxybutynin and atomoxetine.

In an embodiment, the medicament efficacy measure is derived from one or more of:
  an input provided by the subject or other user of the method;
  a motion signal;
  a pressure signal;
  an audible signal;
  a visual signal;
  an SpO2 signal;
  a heart rate of the subject;
  an ECG obtained from the subject;
  a PPG obtained from the subject; and
  an apnea hypopnea index.

In this way, the efficacy of the dose level of the medicament may be derived in a number of ways.

In an embodiment, the method further comprises obtaining a side effect measure based on a response of the subject to the previous dose, and wherein determining the dose titration is further based on the side effect measure.

In this way, both the medicament efficacy and the side effects associated with said medicament may be taken into account when determining the dose titration for the subsequent dose. Accordingly, the method may balance the efficacy and side effects of the medicament for the individual subject in order to reach an optimal dose level.

In a further embodiment, the side effect measure is derived from an input provided by the subject or another user of the method.

In this way, the side effects of the dose level of the medicament may be derived based on the subjective experience of the subject in response to the given dose of the medicament.

According to examples in accordance with an aspect of the invention, there is provided a processing system for controlling a dose titration of a medicament to be provided to a subject for treating obstructive sleep apnea, wherein the processing system is adapted to:
  obtain a dose level of a previous dose of the medicament, the previous dose having been provided to the subject;
  obtain a medicament efficacy measure based on a response of the subject to the previous dose; and
  determine a dose titration for a future dose of the medicament based on the medicament efficacy measure and the dose level of the previous dose.

In an embodiment, the processing system is further adapted to determine a supplementary treatment for the subject based on the medicament efficacy measure.

In this way, any residual obstructive sleep apnea that cannot be treated by way of the medicament, for example due to side effects caused by the required dose of the medicament, may be treated in an alternative way.

According to examples in accordance with an aspect of the invention, there is provided a system for controlling a dose titration of a medicament to be provided to a subject for treating obstructive sleep apnea, wherein the system comprises:

the processing system as described above; and a subject monitoring system adapted to acquire a medicament efficacy measure from the subject.

In an embodiment, the subject monitoring system is further adapted to acquire a side effect measure based on a response of the subject to the previous dose.

In an embodiment, the system comprises an automated medicament dispensing system adapted to dispense the future dose of the medicament.

In this way, a medicament dispensing system may be continually updated to dispense the determined dose of the medicament automatically.

In an embodiment, the subject monitoring system comprises one or more of:

a user interface adapted to receive an input from the subject or another user of the system;
a motion sensor;
a pressure sensor;
a microphone;
a camera;
a pulse oximeter;
a heart rate monitor;
an ECG sensor.

In an embodiment, the subject monitoring system comprises a smart device, wherein the smart device comprises one or more of:

a smartphone;
a smart watch; and
a smart home device.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
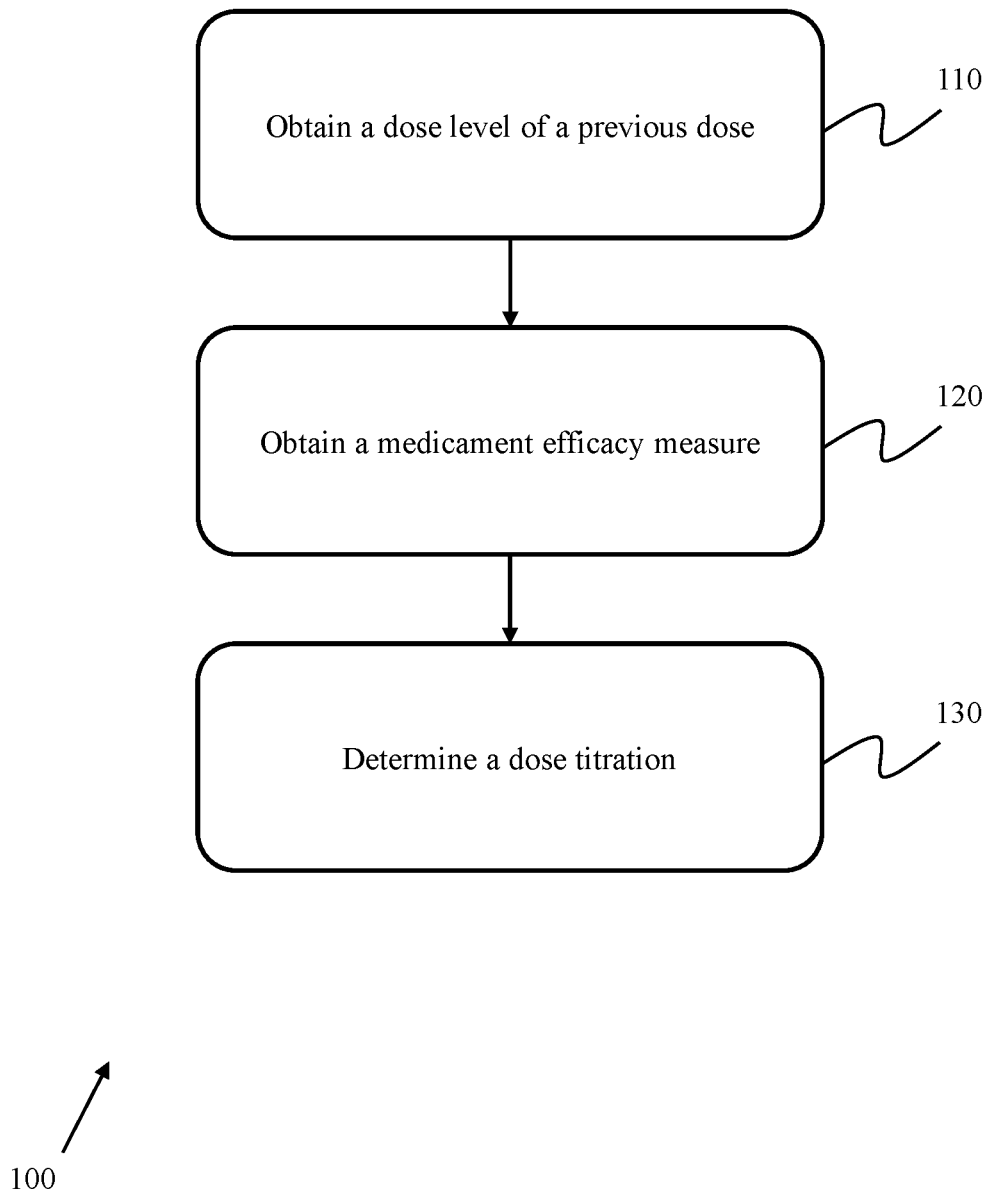
FIG. 1 shows a method according to an aspect of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a computer-implemented method for controlling a dose titration of a medicament to be provided to a subject for treating obstructive sleep apnea. The method includes obtaining a dose level of a previous dose of the medicament, the previous dose having been provided to the subject and obtaining a medicament efficacy measure based on a response of the subject to the previous dose. A dose titration for a future dose of the medicament is determined based on the medicament efficacy measure and the dose level of the previous dose.

FIG. 1 shows a computer-implemented method 100 for controlling a dose titration of a medicament to be provided to a subject for treating obstructive sleep apnea.

Dose titration is the process of adjusting the dose level of a medicament, a medicament being any suitable therapeutic pharmaceutical product, in order to deliver the maximum therapeutic benefit without introducing adverse side effects to the subject. Different medicaments will possess different therapeutic indices, wherein a narrow therapeutic index indicates a narrow range of dose levels between which the medicament will deliver a therapeutic effect. Further, for a medicament with a narrow therapeutic index, the dose level at which side effects will occur is low. Thus, dose titration is particularly valuable in cases where medicaments with a narrow therapeutic index are to be provided to the subject.

The method begins in step 110, by obtaining a dose level of a previous dose of the medicament, the previous dose having been provided to the subject.

In step 120, a medicament efficacy measure is obtained based on a response of the subject to the previous dose. The medicament efficacy measure may be any suitable measure relating to the efficacy of the previous dose of the medicament in the treatment of obstructive sleep apnea.

For example, the medicament efficacy measure may be derived from one or more of: a user input, for example provided by a clinician monitoring the subject; an input provided by the subject, for example by the subject providing a user input indicating their perceived efficacy of the medicament; a motion signal, such an accelerometer adapted to measure the motion of the subject when sleeping; a pressure signal, for example measuring the changes in pressure measured from under a mattress on which the is subject is sleeping; an audible signal, for example as captured by a microphone in the room in which the subject is sleeping; a visual signal for example as captured by a camera in the room in which the subject is sleeping; an SpO2 signal, for example as captured by a pulse oximeter in communication with the subject; a heart rate of the subject, for example as captured by a heart rate monitor in communication with the subject; an ECG obtained from the subject; and an apnea hypopnea index (AHI), which represents the number of apnea and hypopnea events that occur per hour of sleep.

Put another way, the medicament efficacy measure may include any data provided by, or collected from, the subject that is representative of the change in OSA occurring in the subject in response to the previously provided dose of the medicament.

The method may utilize data from more than one previous dose of the medicament, each previous dose having an associated dose level, and the medicament efficacy measure associated with each previous dose. In other words, dose levels and medicament efficacy measures of a plurality of previous doses may be obtained in order to track a response of the subject to the medicament doses over time.

In addition to the medicament efficacy measure, the proportion of the plurality of previous doses that were successfully taken by the subject may also be taken into account. Although a dose may be dispensed to the subject, the subject may not always take the dose as intended. In this case, the subject may still be monitored in order to evaluate the effects of the missed dose, or missed doses, on the treatment of the subject.

In step 130, a dose titration for a future dose of the medicament is determined based on the medicament efficacy measure and the dose level of the previous dose.

The dose titration may include one or more of: an increase in dose level; a decrease in dose level; no change in dose level; a discrete increase in dose level, for example in response to the medicament efficacy measure exceeding, or not exceeding, a given threshold; a discrete decrease in dose level, for example in response to the medicament efficacy measure exceeding, or not exceeding, a given threshold; a continuous increase in dose level, based on the medicament efficacy measure; and a continuous decrease in dose level, based on the medicament efficacy measure. The dose titration may include upper and lower limits on the dose levels, which may be controlled by the subject, a clinician or by the manufacturer of the medicament.

Following the determination of the dose titration, the future dose of the medicament may be dispensed, or administered, to the subject at an appropriate time according to the dosing regimen of the subject. The efficacy of the subsequent dose may then be measured and the dose titration of the medicament may be performed in an ongoing iterative manner based on each subsequent dose taken by the subject. The dose titration will eventually result in an optimal dose of the medicament that provides the optimal efficacy for the subject based on the subject's individual response to the given medicament. The medicament efficacy may continue to be monitored in order to adjust the dose level in response to changes in the subject, such as changes in the subject's physiology or environment.

The medicament may include a plurality of component medicaments, each of which are intended to deliver a given therapeutic effect. Accordingly, the dose level of the medicament will comprise a plurality of component levels, wherein each component level represents a proportion of a component medicament in the overall dose of the medicament. Accordingly, adjusting the dose level of the medicament as described above may further comprise adjusting one or more of the plurality of component levels based on a medicament efficacy measure associated with each of the component medicaments.

For example, the medicament may comprise two component medicaments, such as oxybutynin and atomoxetine, in which case, the dose level of the medicament comprises an oxybutynin component level and an atomoxetine component level.

In OSA, the muscles that maintain an open upper airway collapse repeatedly. The hypoglossal nerve controls many of these muscles, including the crucial tongue muscle, the genioglossus. Oxybutynin blocks receptors for acetylcholine on hypoglossal motor neurons, making the genioglossus muscle more responsive during rapid eye movement (REM) sleep. Atomoxetine prevents norepinephrine from being resorbed by neurons that release it, increasing its signal. In combination with oxybutynin, atomoxetine boosts responsiveness of the genioglossus in non-REM (NREM) sleep.

The combination of oxybutynin and atomoxetine purports to increase genioglossus activation during REM and NREM sleep, thereby increasing airway patency and significantly lowering the AHI of a subject.

By monitoring the efficacy of each medicament component, the dose titration of the individual components and their combination may be more accurately performed. Put another way, the automatic dose titration of a medicament for treating OSA may differentially and independently titrate each of the medicament components. In the specific example where the medicament comprises an oxybutynin medicament component and an atomoxetine medicament component, if there is residual REM-dominant AHI indicated by the medicament efficacy measure, then the oxybutynin component dose level may be increased; whereas, if there is NREM-dominant residual AHI indicated by the medicament efficacy measure, then the atomoxetine component dose level may be increased.

In addition to monitoring the efficacy of the doses of the medicament provided to the subject, a side effect measure may also be obtained from the subject based on a response of the subject to the previous dose of the medicament. Accordingly, the dose titration may be additionally determined based on the side effect measure.

Any medicament will likely produce one or more side effects in the subject, which are different from the intended therapeutic effects of the medicament, or medicament components. Side effects may range from minor side effects, which may be tolerable to the subject, to major side effects, which may be intolerable to the subject. The side effects, and their intensity, will vary from subject to subject and are dependent on the dose level of the provided medicament.

The side effect measure may be derived from one or more of: a user input, for example provided by a clinician monitoring the subject; an input provided by the subject, for example by the subject providing a user input indicating their perceived side effects of the medicament; a motion signal, such an accelerometer adapted to measure the motion of the subject when sleeping; a pressure signal, for example measuring the changes in pressure of the subject on a mattress when sleeping; an audible signal, for example as captured by a microphone in the room in which the subject is sleeping; a visual signal for example as captured by a camera in the room in which the subject is sleeping; an SpO2 signal, for example as captured by a pulse oximeter in communication with the subject; a heart rate of the subject, for example as captured by a heart rate monitor in communication with the subject; and an ECG obtained from the subject.

The subject efficacy measure and the side effect measure may be derived from one or more of the same signals, or from different signals, acquired from the subject.

For example, where a motion signal, also referred to as an actigraph, is acquired from the subject, for example by way of an actimetry sensor, a reduced amount of movement of the subject when sleeping may be indicative of undisturbed sleep, which may be indicative of a high level of medicament efficacy. Put another way, actigraphy signals may be processed to generate information about a subject's sleep, for example in the form of a sleep/wake hypnogram or an arousal index, which may then be used to derive conclusions about the sleep quality of the subject. The sleep quality conclusions may then be used to determine the medicament efficacy measure.

Further, a motion signal showing a reduced amount of motion may also be indicative of a low level of side effects that would typically disturb the sleep of the subject, such as frequent urination. On the other hand, a motion signal showing a high level of movement during sleep may be indicative of disturbed sleep. This may indicate that the efficacy of the medicament is low, which may result in disturbed sleep, or that the side effects resulting in disturbed sleep are high, which may result in disturbed sleep regardless of the efficacy of the medicament.

In a similar manner, a pressure signal showing a small number of changes in pressure of the subject on a mattress may be indicative of undisturbed sleep, which may correspond to a high medicament efficacy measure and/or a low medicament side effect measure. Whereas, a large number of changes in pressure of the subject on a mattress may be indicative of disturbed sleep, which may correspond to a low medicament efficacy measure and/or a high medicament side effect measure.

Further, as under mattress pressure sensors may be sensitive to the respiration and the heart rate of the subject, and can provide signals of each, the obtained pressure signals may be processed to determine the sleep staging of the subject, for example waking, light sleep, deep sleep and REM sleep, as well as indices of disrupted sleep such as AHI, respiratory disturbance indices (RDI), an arousal index and the like.

In the case where the signal acquired from the subject is an audible signal or a visual signal, the amount of detected activity of the subject may indicate the frequency of sleep disturbance. For example, frequent audible changes in breathing patterns or audible footsteps and the subject visibly leaving their bed may be indicative of disturbed sleep, which may correspond to a low medicament efficacy measure and/or a high medicament side effect measure.

Further, in the case where the signal acquired form the subject is an audible signal, the audible signal may be used to determine one or more of subject movement, subject snoring, apneic events and respiration. These signals may be used to determine arousal indices as well as sleep quality and other measures of medicament efficacy, such as AHI or a snore index.

Further, frequent changes in the heart rate or SpO2 measurements of the subject may indicate disturbed sleep, which may correspond to a low medicament efficacy measure and/or a high medicament side effect measure. Extended periods of consistent heart rate or SpO2 measurements may correspond to a high medicament efficacy measure and/or a low medicament side effect measure.

SpO2 is one of the key metrics used for monitoring OSA, which is most often associated with a high arousal index and a high oxygen desaturation index (ODI) as derived from SpO2 measurements. Specifically, a high ODI would indicate low medicament efficacy.

Further, instantaneous heart rate measurements may be used to determine heart rate variability (HRV), which may be used in the determination of sleep staging, arousal indices and the like.

In the case where the signal acquired from the subject is an ECG signal or a PPG signal, the sleep stages of the subject may be determined across a sleep session, which may be indicative of the quality of sleep of the subject during the sleep session. For example, a large number of sleep stage transitions from a deep sleep stage, such as stage 3 non-REM sleep, to a light sleep stage, such as stage 1 or 2 non-REM sleep, may be indicative of disturbed sleep, which may correspond to a low medicament efficacy measure and/or a high medicament side effect measure. A lower number of sleep stage transitions may be indicative of undisturbed sleep, which may correspond to a high medicament efficacy measure and/or a low medicament side effect measure.

Alternatively, or in addition, to the examples given above, side effect measures may be derived based on subjective input provided by the subject indicating their perceived experience of side effects, and the intensity of said side effects, in response to the dose of the medicament.

In the case where the medicament comprises oxybutynin, the side effect measure may be derived from additional objective data, such as daytime drowsiness, measured by a daytime alertness monitoring means, and decreased sweating, which may be measured by a GRS sensor.

In the case where the medicament comprises atomoxetine, the side effect measure may also be derived from additional objective data, such as by monitoring the weight of the subject, and more specifically weight loss in the subject.

Thus, the differential and independent titration of each component of a medicament may also be performed on the basis of the side effects presented by the user. In the example where the medicament comprises oxybutynin and atomoxetine, if the subject self-reports difficulty with urination or if the quantity of REM sleep is significantly reduced, the component dose level of oxybutynin may be decreased; whereas, if the subject self-reports nausea, the component dose level of atomoxetine may be decreased.

As discussed above, the adherence of the subject to the medication regimen, i.e. the proportion of the previous doses successfully taken by the subject, may be monitored in combination with side effects. If the subject is determined to not be adhering to the regimen, likely due to excessive side effects, a lower target for the medicament efficacy measure may be set and a the dose level of the medicament lowered.

Figure 2:
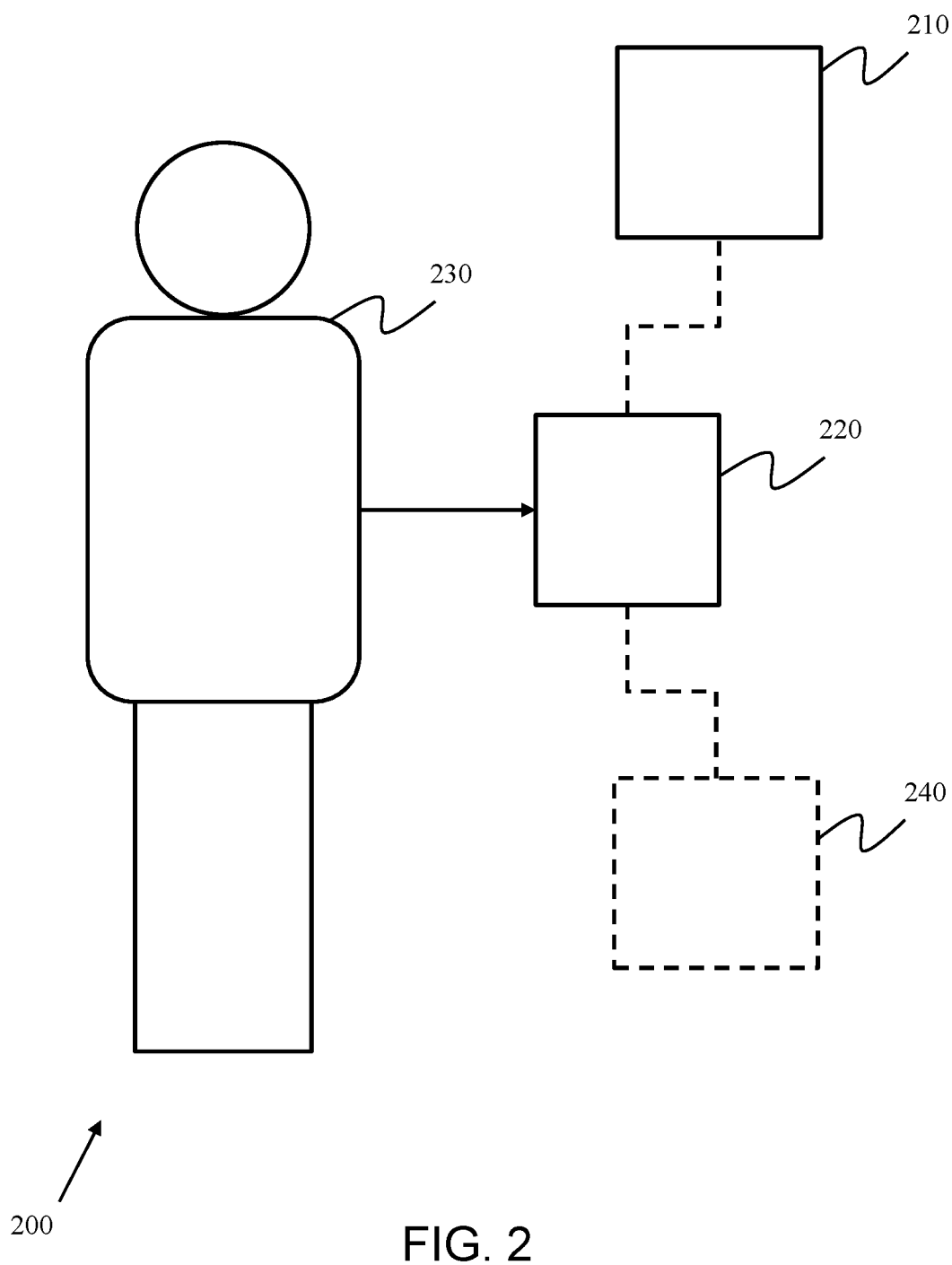
FIG. 2 shows a system for controlling a dose titration of a medicament.

In practice, the methods described above may be implemented by a system for controlling a dose titration of a medicament to be provided to a subject for treating obstructive sleep apnea. FIG. 2 shows a schematic representation of such a system 200.

In the example shown in FIG. 2, the system comprises a processing system 210 adapted to implement the methods described above and a subject monitoring system 220 adapted to acquire the medicament efficacy measure from the subject 230.

The processing system may be any suitable processing system, including a remote processing system in communication with the subject monitoring system.

The subject monitoring system may comprise one or more of: a user interface adapted to receive an input from a user and/or the subject; a motion sensor; a pressure sensor; a microphone; a camera; a pulse oximeter; a heart rate monitor; and an ECG sensor.

The subject monitoring system and/or the processing system may be partially, or completely, incorporated into a smart device of the subject, such as a smartphone, a smart watch or a smart home device. For example, a smart watch may include a motion sensor and heart rate sensor and a smart phone may include a motion sensor, a microphone, a camera and a processing system capable of carrying out the methods described above.

Further, the subject monitoring system may be further adapted to acquire a side effect measure based on a response of the subject to the previous dose. The side effect measure may be obtained using any of the sensor arrangements described above.

The system 200 may further include an automated medicament dispensing system 240 adapted to dispense the subsequent dose of the medicament. The automated medicament dispensing system may be any suitable system capable of receiving the adjusted dose level and dispensing the subsequent dose of the medicament to the subject.

The system may continue to monitor any indications of residual AHI based on the medicament efficacy measure and determine a supplementary treatment for the subject. As is known with active genioglossus stimulation, not every patient will respond to a therapy that solely increases the passive critical closing pressure (Pcrit) in the subject's airways. For example, the subject monitoring system may determine if the subject possesses a decreased arousal threshold or an increased loop gain. If the subject has a high loop gain, supplemental oxygen therapy or acetazolamide may be suggested as a supplementary treatment. If the patient has a low arousal threshold, hypnotics may be suggested as a supplementary treatment.

In practice, doses of the medicament at various different dosing levels will be provided to the subject over time based on the dose titration methods described above. For example, in the case that the medicament comprises oxybutynin and atomoxetine, a number of previous doses may include a series of doses as follows: 5 mg oxybutynin+80 mg atomoxetine, 2 mg oxybutynin+40 mg atomoxetine, 2 mg oxybutynin+80 mg atomoxetine, 1 mg oxybutynin+20 mg atomoxetine, and so on.

The efficacy of the treatment is monitored following each dose provided to the subject in the form of the medicament efficacy measure. The medicament efficacy measure can be obtained by various means, such as: an under mattress sensor, a smartphone application, a wrist-worn wearable, an SpO2 sensor, an in-room sensor, such as a microphone or camera and the like. While an accurate AHI measurement is a useful medicament efficacy measure, approximate values and/or trended data over time may also be used to assess the relative efficacy of the treatment. The efficacy of the treatment may be trended across different dosing levels.

In addition to monitoring the efficacy of the treatment, the side effects of the medicament are also monitored and/or reported by the subject. Side effect measures may be provided by self-report by the subject, for example by way of a smartphone application. Alternatively, or in addition, side effect measures may be objectively monitored and may include non-respiratory sleep disturbances, a reduction in REM sleep, sleep architecture abnormalities and the like. Side effect severity may be trended across different dosing levels.

The efficacy of the treatment and the severity of the side effects may be monitored by the system in order to optimize the therapy regimen and dose levels of the medicament by way of dose titration as described above.

Figure 3A:
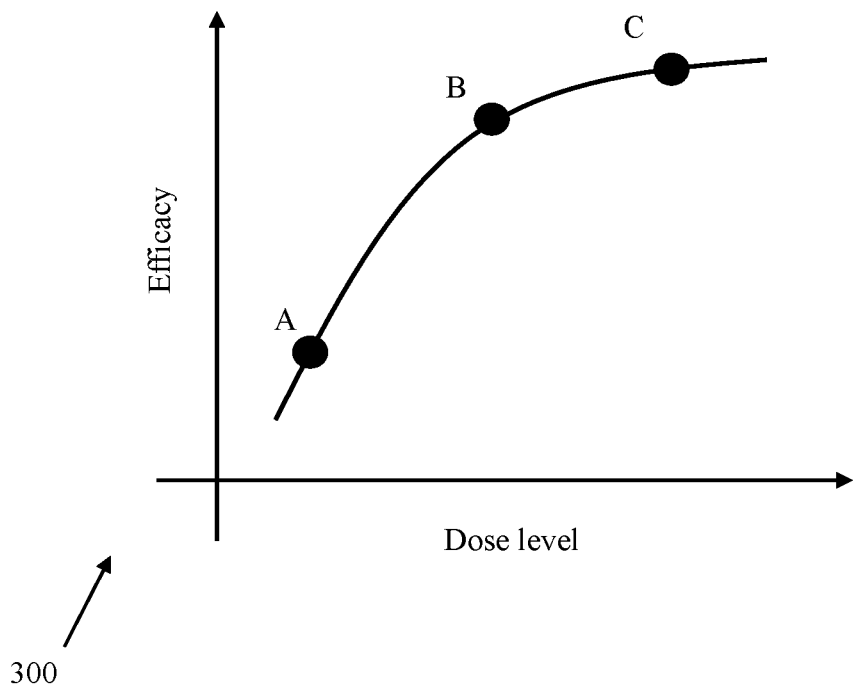
FIG. 3A shows a graph depicting a trend in medicament efficacy against dose level.
Figure 3B:
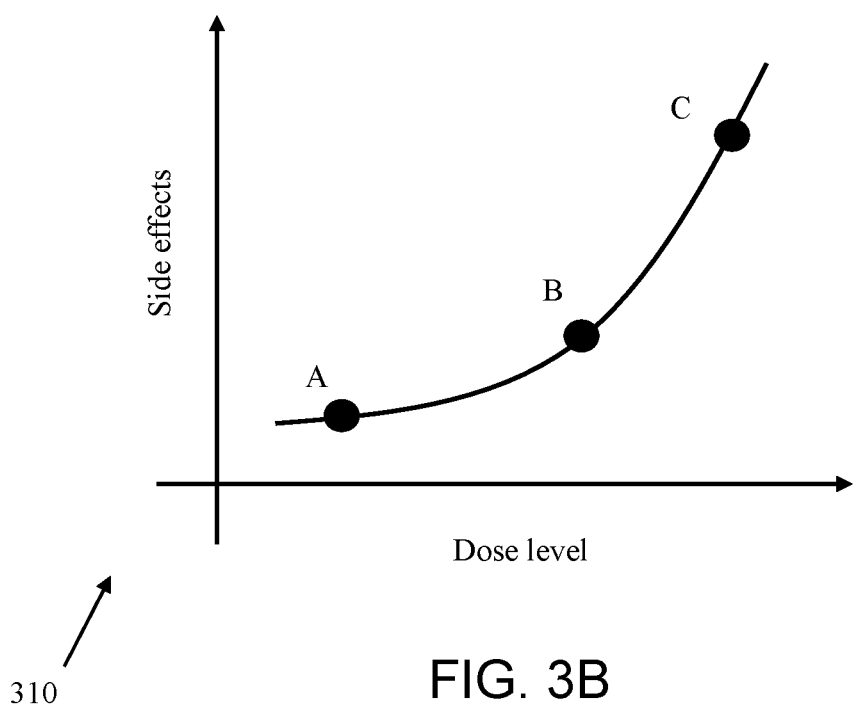
FIG. 3B shows a graph depicting a trend in side effect severity against dose level.

FIGS. 3A and 3B show a graph 300 depicting a trend in the efficacy of the medicament across different dose levels and a graph 310 depicting a trend in the severity of the side effects of the medicament across different dose levels of said medicament. According to FIGS. 3A and 3B, different points (A, B and C) can be determined on the patient profile dosing curve. Point 'A' is exemplary of a dosing level where the treatment is ineffective and needs to be increased. Point 'C' is exemplary of a dosing level where the treatment is effective, but the side effects are severe. Point 'B' is exemplary of a dosing level where the treatment is effective and the side effects are not severe.

Figure 4:
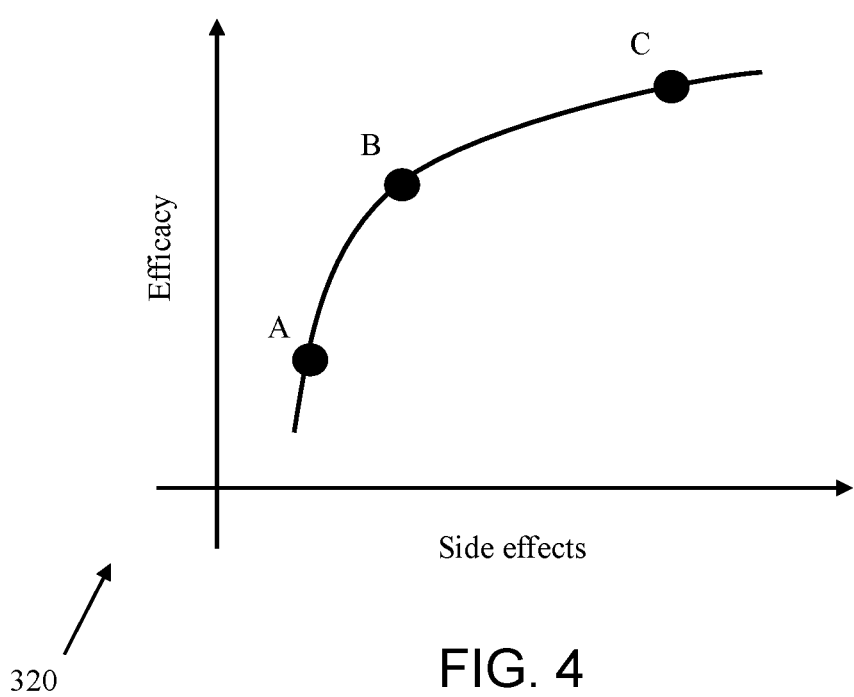
FIG. 4 shows a graph depicting a relationship between medicament efficacy and side effect severity for a given medicament.

FIG. 4 shows a graph 320 depicting the relationship between medicament efficacy and side effect severity for a given medicament.

It should be noted that each subject's dosing curve may appear different and is likely to change over time in response to changes in the subject's physiology and/or environment. As such, continuous trending of treatment efficacy and side effect severity may be performed, as well as continuous dose titration, especially when lowering dosing levels may be possible, in order to show if efficacy may be maintained at a lower dosage.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method for controlling a dose titration of a medicament to be provided to a subject for treating obstructive sleep apnea, wherein the medicament comprises a plurality of component medicaments comprising an oxybutynin medicament component and an atomoxetine medicament component, wherein the dose level comprises a plurality of component levels and wherein each component level represents a proportion of a component medicament in the dose of the medicament, the method comprising:
    obtaining a dose level of a previous dose of the medicament, the previous dose having been provided to the subject;
    providing a sensor in operative communication with the subject so as to monitor a physiological parameter of the subject;
    obtaining a medicament efficacy measure based on a response of the subject to the previous dose as measured by the sensor, wherein the medicament efficacy measure determines whether there is a residual REM-dominant AHI or a NREM-dominant residual AHI present in the subject; and
    determining a dose titration for one or more of the component medicaments for a future dose of the medicament based on the medicament efficacy measure and the dose level of the previous dose, wherein if there is residual REM-dominant AHI indicated by the medicament efficacy measure, then the oxybutynin component is increased, whereas if there is NREM-dominant residual AHI indicated by the medicament efficacy measure, then the atomoxetine component dose level is increased.

2. The method as claimed in claim 1, wherein the method comprises obtaining a dose level of a plurality of previous doses and obtaining a medicament efficacy measure of each of the plurality of previous doses, wherein determining the dose titration is based on the plurality of medicament efficacy measures and the dose levels of the plurality of previous doses.

3. The method as claimed in claim 2, wherein the method further comprises determining a proportion of the plurality of previous doses that were successfully taken by the subject.

4. The method as claimed in claim 1, wherein the medicament efficacy measure is derived from one or more of:
   an input provided by the subject or another user of the method;
   a motion signal;
   a pressure signal;
   an audible signal;
   a visual signal;
   an SpO2 signal;
   a heart rate of the subject;
   an ECG obtained from the subject;
   a PPG obtained from the subject; and
   an apnea hypopnea index.

5. The computer-implemented method as claimed in claim 1, wherein the method further comprises obtaining a side effect measure based on a response of the subject to the previous dose, and wherein determining the dose titration is further based on the side effect measure.

6. The computer-implemented method as claimed in claim 1, further comprising an automated medicament-dispensing system adapted to prepare and deliver to the subject the titrated dose based on the determined dose titration.

7. A processing system for controlling a dose titration of a medicament to be provided to a subject for treating obstructive sleep apnea, comprising:
   a sensor in operative communication with the subject so as to monitor a physiological parameter of the subject; and
   a processing system, wherein the medicament comprises a plurality of component medicaments comprising an oxybutynin medicament component and an atomoxetine medicament component, wherein the dose level comprises a plurality of component levels and wherein each component level represents a proportion of a component medicament in the dose of the medicament, wherein the processing system is adapted to:
   obtain a dose level of a previous dose of the medicament, the previous dose having been provided to the subject;
   obtain a medicament efficacy measure based on a response of the subject to the previous dose as measured by the sensor, wherein the medicament efficacy measure includes a determination as to whether there is residual REM-dominant AHI or a NREM-dominant residual AHI present in the subject; and
   determine a dose titration for one or more of the component medicaments for a future dose of the medicament based on the medicament efficacy measure and the dose level of the previous dose, wherein if there is residual REM-dominant AHI indicated by the medicament efficacy measure, then the oxybutynin component is increased, whereas if there is NREM-dominant residual AHI indicated by the medicament efficacy measure, then the atomoxetine component dose level is increased.

8. The processing system as claimed in claim 7, wherein the processing system is further adapted to determine a supplementary treatment for the subject based on the medicament efficacy measure.

9. A system for controlling a dose titration of a medicament to be provided to a subject for treating obstructive sleep apnea, wherein the system comprises:
   (a) a sensor in operative communication with the subject so as to monitor a physiological parameter of the subject;
   (b) a processing system, wherein the medicament comprises a plurality of component medicaments comprising an oxybutynin medicament component and an atomoxetine medicament component, wherein the dose level comprises a plurality of component levels and wherein each component level represents a proportion of a component medicament in the dose of the medicament, wherein the processing system is adapted to:
   obtain a dose level of a previous dose of the medicament, the previous dose having been provided to the subject;
   obtain a medicament efficacy measure based on a response of the subject to the previous dose as measured by the sensor, wherein the medicament efficacy measure includes a determination as to whether there is residual REM-dominant AHI or a NREM-dominant residual AHI present in the subject; and
   determine a dose titration for one or more of the component medicaments for a future dose of the medicament based on the medicament efficacy measure and the dose level of the previous dose, wherein if there is residual REM-dominant AHI indicated by the medicament efficacy measure, then the oxybutynin component is increased, whereas if there is NREM-dominant residual AHI indicated by the medicament efficacy measure, then the atomoxetine component dose level is increased; and
   an automated medicament-dispensing system adapted to prepare and deliver to the subject the titrated dose based on the determined dose titration.

10. The system as claimed in claim 9, wherein the sensor is further adapted to acquire a side effect measure based on a response of the subject to the previous dose.

11. The system as claimed in claim 9, wherein the sensor comprises one or more of:
    a user interface adapted to receive an input from the subject or another user of the system;
    a motion sensor;
    a pressure sensor;
    a microphone;
    a camera;
    a pulse oximeter;
    a heart rate monitor;
    an ECG sensor.

12. The system as claimed in claim 9, wherein the sensor comprises a smart device, wherein the smart device comprises one or more of:
    a smartphone;
    a smart watch; and
    a smart home device.

* * * * *